(12) United States Patent
Park (10) Patent No.: US 11,953,772 B2
(45) Date of Patent: Apr. 9, 2024

(54) TOUCH DRIVING DEVICE AND TOUCH SENSING DEVICE INCLUDING SAME

(71) Applicant: LX SEMICON CO., LTD., Daejeon (KR)

(72) Inventor: Sun Young Park, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/182,595

(22) Filed: Mar. 13, 2023

(65) Prior Publication Data
US 2023/0418100 A1    Dec. 28, 2023

(30) Foreign Application Priority Data
Jun. 24, 2022    (KR) .......................... 10-2022-0077569

(51) Int. Cl.
G02F 1/1333    (2006.01)
(52) U.S. Cl.
CPC ................................ G02F 1/13338 (2013.01)
(58) Field of Classification Search
None
See application file for complete search history.

(56) References Cited

U.S. PATENT DOCUMENTS

| | | | | |
|---|---|---|---|---|
| 2011/0113371 | A1* | 5/2011 | Parker | G06F 1/3215 715/810 |
| 2015/0338943 | A1* | 11/2015 | Donnelly | G06F 3/041 345/173 |
| 2016/0103649 | A1* | 4/2016 | Yoshitani | H10K 59/18 345/694 |
| 2016/0132281 | A1* | 5/2016 | Yamazaki | G06F 3/0446 345/1.3 |
| 2017/0031523 | A1* | 2/2017 | Seo | G06F 3/0443 |
| 2017/0344171 | A1* | 11/2017 | Qiao | G06F 3/038 |
| 2021/0303126 | A1* | 9/2021 | Akiyoshi | G06F 3/0446 |
| 2021/0397281 | A1* | 12/2021 | Gupta | G02F 1/13336 |
| 2023/0039953 | A1* | 2/2023 | Seger, Jr. | G06F 3/0444 |

FOREIGN PATENT DOCUMENTS

KR    10-2017-0049668 A    5/2017
KR    10-2019-0079170 A    7/2019

* cited by examiner

*Primary Examiner* — Ryan A Lubit
(74) *Attorney, Agent, or Firm* — ROTHWELL, FIGG, ERNST & MANBECK, P.C.

(57) ABSTRACT

Disclosed herein a touch display driving device for driving a touch panel including first and second touch panels, which includes a plurality of touch sensing circuits configured to receive a touch sensing signal from the touch panel, and a plurality of driving device pads connected to the touch panel and selectively connected to the touch sensing circuit, wherein the plurality of driving device pads are divided into first, second, and third driving device pads, and when the touch sensing signal is received from the first touch panel through the first and second driving device pads, the touch sensing circuit connected to the third driving device pad is turned off.

19 Claims, 9 Drawing Sheets

TOUCH DRIVING DEVICE AND TOUCH SENSING DEVICE INCLUDING SAME

CROSS-REFERENCE TO RELATED APPLICATIONS

This application claims the benefit of the Korean Patent Applications No. 10-2022-0077569 filed on Jun. 24, 2022, which are hereby incorporated by reference as if fully set forth herein.

FIELD

The present disclosure relates to a touch driving device and a touch sensing device including the same.

BACKGROUND

As display devices for displaying images, liquid crystal displays (LCDs) using liquid crystals and organic light-emitting diode (OLED) displays using OLEDs are typical.

Recently, moving away from the usual input manners such as buttons, keyboards, and a mouse, display devices having touch panels capable of detecting a touch input by a user's finger or a stylus pen (hereinafter referred to as "touch display devices") are widely used. The above-described touch display device includes a touch sensing device.

The touch sensing device includes a touch sensor (or a touch electrode) and a touch driving device. Particularly, the touch driving device detects touch sensing data by driving touch sensors (or touch electrodes) and detects touch information including the presence or absence of a touch or touch coordinates using the detected touch sensing data.

SUMMARY

Accordingly, according to the present disclosure, there are provided a touch driving device and a touch sensing device including the same.

According to an aspect of the present disclosure, there is provided a touch sensing device including a touch sensing circuit configured to receive a touch sensing signal from a touch panel including a first touch panel and a second touch panel, and a plurality of driving device pads connected to the touch panel and selectively connected to the touch sensing circuit, wherein the plurality of driving device pads are divided into a first driving device pad, a second driving device pad, and a third driving device pad, and when the touch sensing signal is received from the first touch panel through the first and second driving device pads, the touch sensing circuit connected to the third driving device pad is turned off.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure. In the drawings.

DETAILED DESCRIPTION

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a touch driving device and a touch display device including the same according to the present disclosure will be described in detail with reference to FIGS. 1 to 6.

Figure 1:
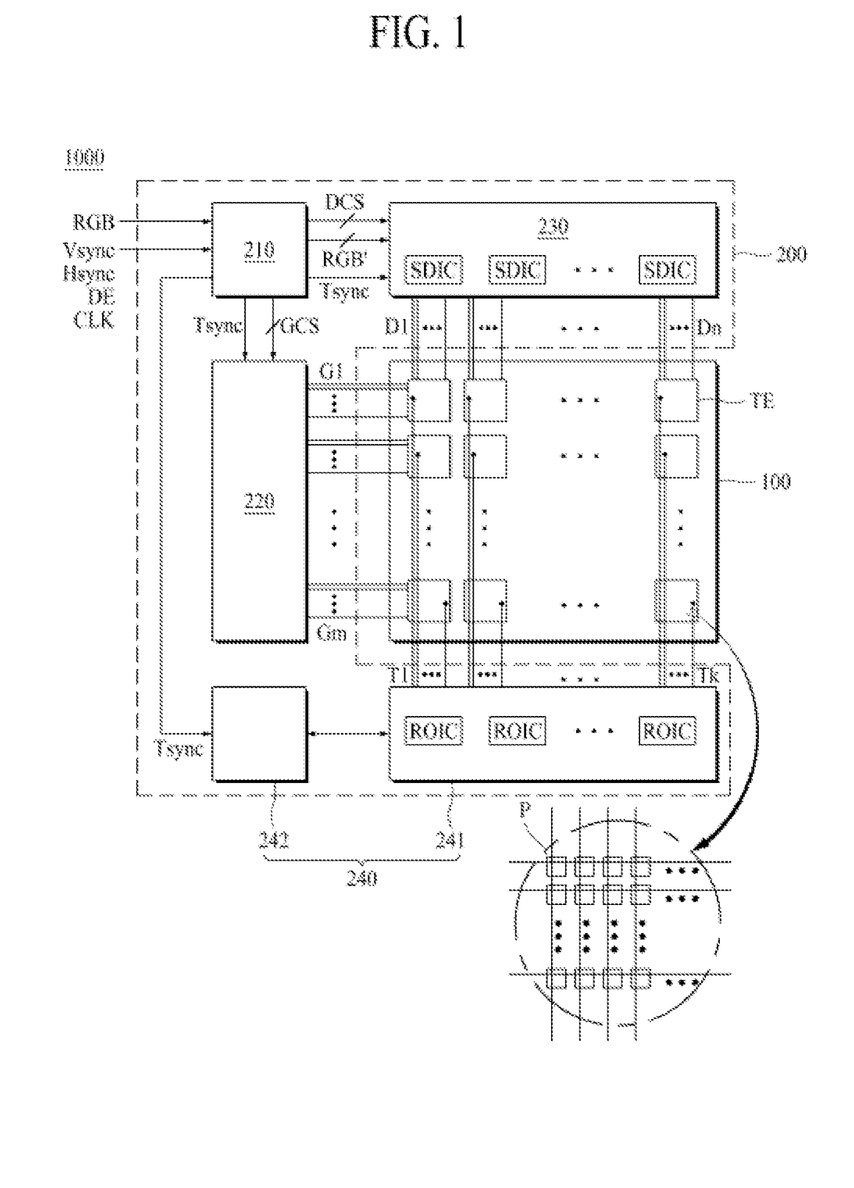
FIG. 1 is a block diagram illustrating a touch display device including a touch driving device according to one embodiment of the present disclosure.
Figure 2:
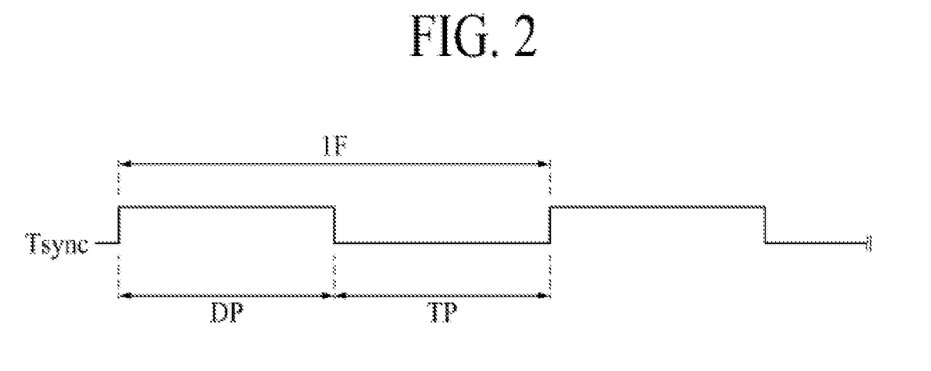
FIG. 2 is a driving timing diagram of a touch display driving device according to one embodiment of the present disclosure.
Figure 3:
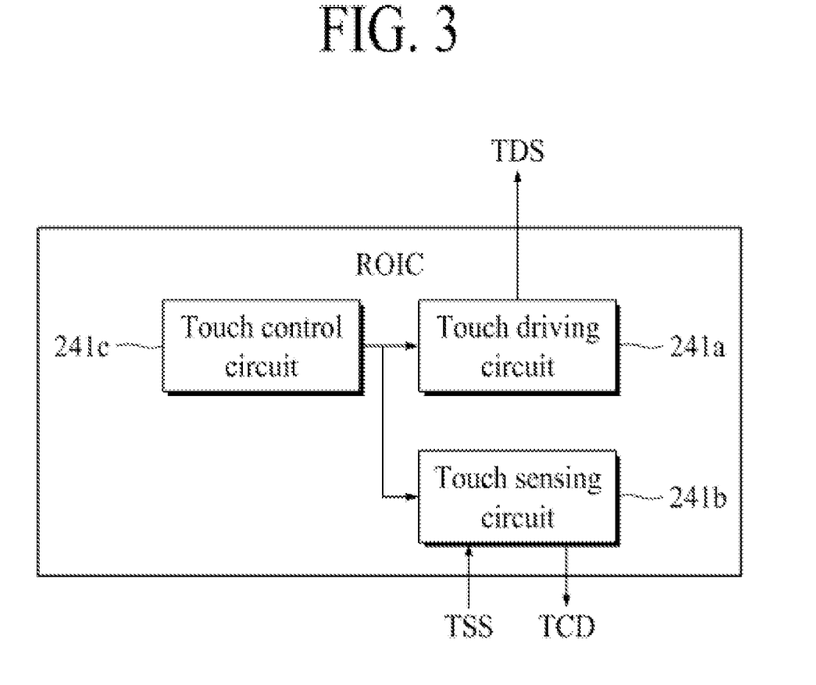
FIG. 3 is a block diagram illustrating a readout integrated circuit according to one embodiment of the present disclosure.
Figure 4:
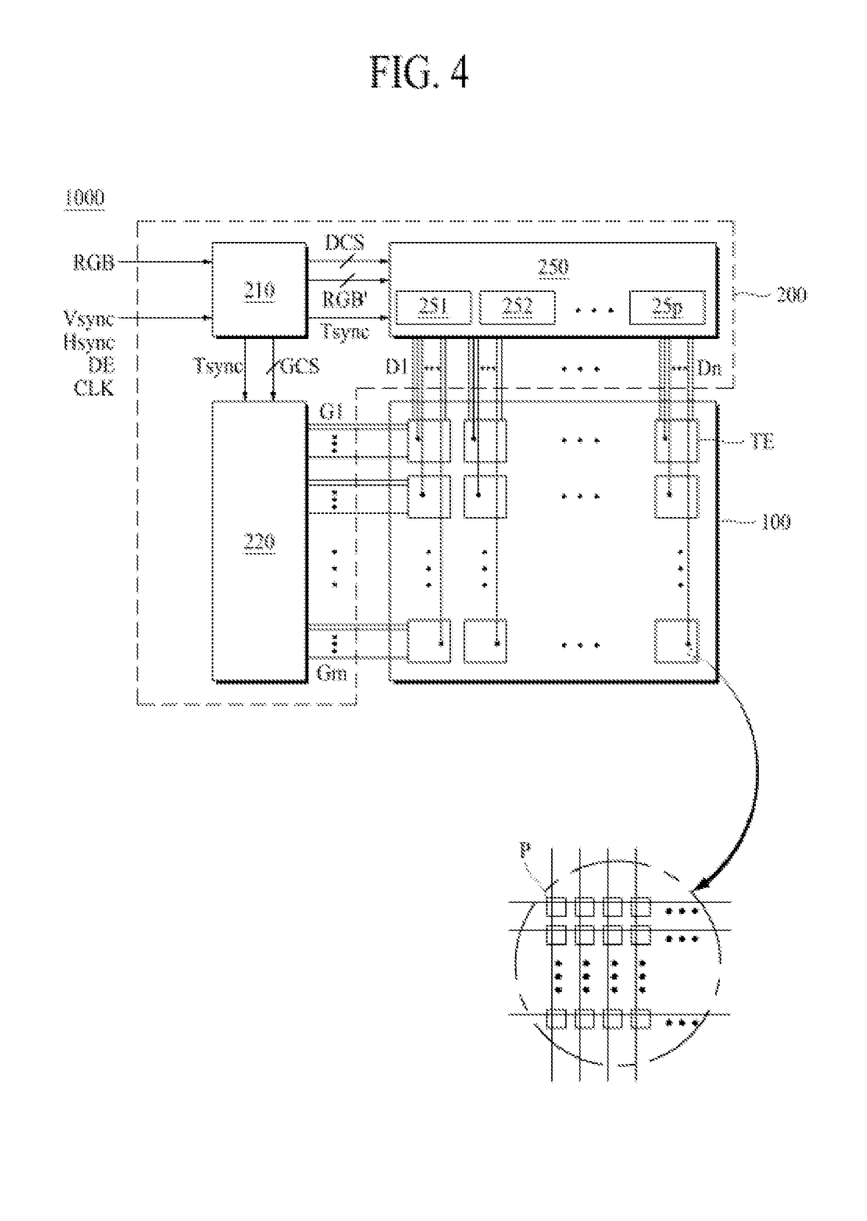
FIG. 4 is a block diagram illustrating a touch display device including a touch driving device according to another embodiment of the present disclosure.
Figure 5:
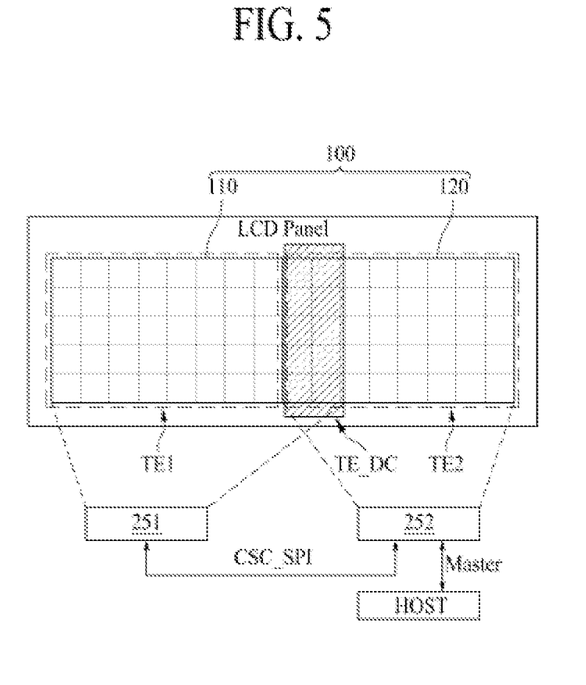
FIG. 5 is a diagram illustrating a connection relationship between a touch panel and the touch driving device according to one embodiment of the present disclosure.
Figure 6:
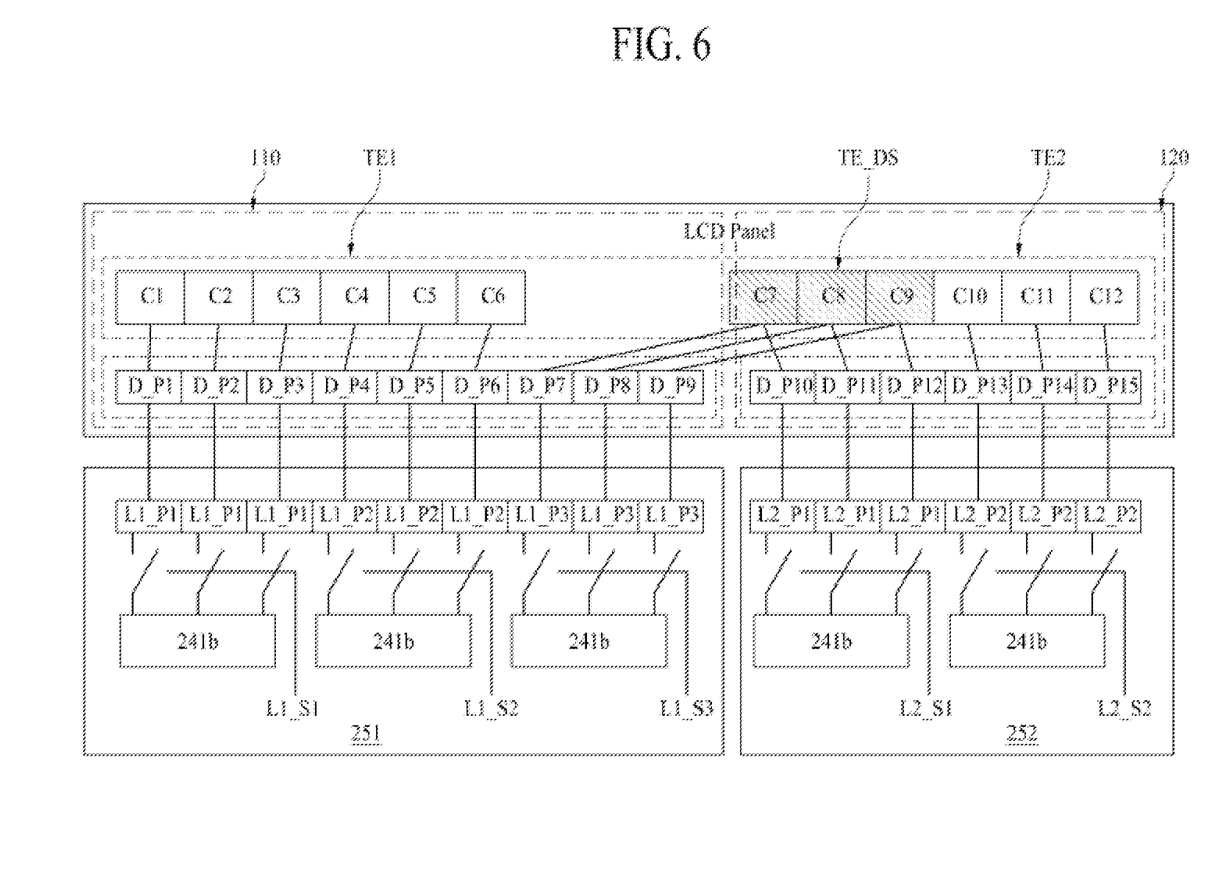
FIG. 6 is a diagram illustrating a connection relationship between a pad of the touch panel and a pad of the touch driving device and a circuit of the pad of the touch driving device according to one embodiment of the present disclosure.

FIG. 1 is a block diagram illustrating a touch display device including a touch driving device according to one embodiment of the present disclosure, and FIG. 2 is a driving timing diagram of a touch display driving device according to one embodiment of the present disclosure. FIG. 3 is a block diagram illustrating a readout integrated circuit according to one embodiment of the present disclosure, and FIG. 4 is a block diagram illustrating a touch display device including a touch driving device according to another embodiment of the present disclosure. FIG. 5 is a diagram illustrating a connection relationship between a touch panel and the touch driving device according to one embodiment of the present disclosure. FIG. 6 is a diagram illustrating a connection relationship between a pad of the touch panel and a pad of the touch driving device and a circuit of the pad of the touch driving device according to one embodiment of the present disclosure.

Referring to FIG. 1, a touch display device 1000 includes a touch display panel 100 and a touch display driving device 200.

The touch display device 1000 performs a display function and a touch sensing function and may be implemented as a flat panel display such as a liquid crystal display (LCD) or an organic light-emitting diode (OLED) display.

The touch display panel 100 displays an image of predetermined gradation or receives a touch. The touch display panel 100 may be an in-cell touch type display panel using a capacitive scheme. Alternatively, the touch display panel 100 may be an in-cell touch type display panel using a self-capacitive scheme or an in-cell touch type display panel using a mutual-capacitive scheme. However, the present disclosure is not limited thereto, and the touch display panel 100 may separately include a display panel for performing a display function and a touch panel for performing a touch sensing function.

As shown in FIG. 2, the touch display panel 100 may be operated during a display period DP and a touch sensing period TP. The touch display panel 100 displays an image using light emitted from a backlight unit during the display period DP and serves as a touch panel for touch sensing during the touch sensing period TP.

The touch display panel 100 includes a plurality of gate lines G1 to Gm, a plurality of data lines D1 to Dn, a plurality of pixels P, a plurality of touch sensors TE, and a plurality of touch lines T1 to Tk.

During the display period DP, each of the plurality of gate lines G1 to Gm receives a scan pulse. During the display period DP, each of the plurality of data lines D1 to Dn receives a data signal. The plurality of gate lines G1 to Gm and the plurality of data lines D1 to Dn are located to intersect with each other on a substrate to define a plurality of pixel regions. Each of the plurality of pixels P may include a thin film transistor (TFT) (not shown) connected to a gate line and a data line which are adjacent to each other, a pixel electrode (not shown) connected to the TFT, and a storage capacitor (not shown) connected to the pixel electrode.

Each of the plurality of touch sensors TE serves as a common electrode that receives a common voltage Vcom during the display period DP and, along with the pixel electrode, forms an electric field to drive a liquid crystal and serves as a touch electrode for touch sensing during the touch sensing period TP. In this case, each of the plurality of touch sensors TE may include a transparent conductive material. However, the present disclosure is not limited thereto, and when the touch panel is separately formed from the display panel, each of the plurality of touch sensors TE may include a conductive material.

Each of the plurality of touch sensors TE may receive the common voltage Vcom from the touch driving device, which will be described below, through each of the plurality of touch lines T1 to Tk during the display period DP. The plurality of touch lines T1 to Tk are each connected to one of the plurality of touch sensors TE. Since each of the plurality of touch sensors TE is used as a self-capacitive type touch sensor during the touch sensing period TP, each of the plurality of touch sensor TE should have a size which is greater than a minimum contact size between a touch object and the touch display panel 100. Accordingly, each of the plurality of touch sensors TE may have a size corresponding to one or more pixels P. The plurality of touch sensors TE may be disposed at regular intervals along a plurality of horizontal lines and a plurality of vertical lines.

According to one embodiment of the present disclosure, the touch display panel 100 may include a first touch display panel 110 and a second touch display panel 120 to display an image in a large area.

During the display period DP, the touch display driving device 200 supplies data signals to the plurality of pixels P included in the touch display panel 100 to allow an image to be displayed through the touch display panel 100. During the touch sensing period TP, the touch display driving device 200 receives the touch sensing signal input from the touch sensor TE, calculates touch coordinate data, and transmits the touch coordinate data to a host system.

The touch display driving device 200 includes a timing controller 210, a gate driving device 220, a data driving device 230, a touch driving device 241, and a touch controller 242.

The timing controller 210 receives various timing signals including a vertical sync signal Vsync, a horizontal sync signal Hsync, a data enable signal DE, and a clock signal CLK from an external system (not shown) and generates a gate control signal GCS for controlling the gate driving device 220 and a data control signal DCS for controlling the data driving device 230. In addition, the timing controller 210 receives an image signal RGB from the external system, converts the image signal RGB into an image signal RGB' in a format to be processed in the data driving device 230, and outputs the image signal RGB'.

Meanwhile, the timing controller 210 may compress an external data enable signal DE transmitted from the host system into a preset display period DP, thereby generating an internal data enable signal iDE. The timing controller 210 may generate the touch sync signal Tsync for time-dividing one frame period into the display period DP and the touch sensing period TP according to timings of the vertical sync signal Vsync and the internal data enable signal iDE. The timing controller 210 may transmit the touch sync signal Tsync to the gate driving device 220, a data driving device 230, and a touch sensing device 240.

The host system converts the digital image data into a format to be suitably displayed on the touch display panel 100. The host system transmits the timing signals together with the digital image data to the timing controller 210. The host system is implemented as any one among a television system, a set-top box, a navigation system, a digital versatile disc (DVD) player, a Blu-ray player, a personal computer (PC), a home theater system, and a phone system and receives an input image.

Meanwhile, the host system may receive the touch coordinate data from the touch controller 242 and execute an application program in conjunction with the received touch input coordinates.

During the display period DP, the gate driving device 220 receives the gate control signal GCS from the timing controller 210. The gate control signal GCS may include a gate start pulse GSP, a gate shift clock GSC, and a gate output enable signal. The gate driving device 220 generates a gate pulse (or a scan pulse) synchronized with the data signal through the received gate control signal GCS, shifts the generated gate pulse, and sequentially supplies the shifted gate pulse to the gate lines G1 to Gm. To this end, the gate driving device 220 may include a plurality of gate drive integrated circuits (ICs) (not shown). During the display period DP, the gate drive ICs sequentially supply the gate pulse synchronized with the data signal to the gate lines G1 to Gm under the control of the timing controller 210 to select a data line in which the data signal is written. The gate pulse swings between a gate high voltage and a gate low voltage.

During the touch sensing period TP, the gate driving device 220 may supply a gate low voltage VGL to the gate lines G1 to Gm without generating the gate pulse. Accordingly, the gate lines G1 to Gm supply the gate pulse to the TFT of each pixel to sequentially select a data line in which the data signal is to be written in the touch display panel 100 during the display period DP and hold at the gate low voltage VGL during the touch sensing period TP to prevent an output variation of the touch sensors TE.

During the display period DP, the data driving device 230 receives the data control signal DCS and the image signal RGB' from the timing controller 210. The data control signal DCS may include a source start pulse SSP, a source sampling clock SSC, and a source output enable signal SOE. The source start pulse SSP controls data sampling start timings of n source drive integrated circuits SDIC constituting the data driving device 230. The source sampling clock SSC is a clock signal for controlling the sampling timing of data in each of the source drive integrated circuits SDIC. The source output enable signal SOE controls an output timing of each source drive integrated circuit SDIC.

To this end, as shown in FIG. 1, the data driving device 230 includes a plurality of source drive integrated circuits SDIC, and each source drive integrated circuit SDIC includes a data driving circuit to convert the received image signal RGB' into an analog data signal and supply the analog data signal to the pixels P through the plurality of data lines D1 to Dn.

The touch driving device 241 detects a touch using touch sensing signals received through the touch sensors TE during the touch sensing period TP. That is, the touch driving device 241 drives the touch sensors TE during the touch sensing period TP to receive the touch sensing signals from the touch sensors TE. To this end, as shown in FIG. 1, the touch driving device 241 may include a plurality of readout integrated circuits ROIC.

As shown in FIG. 3, the readout integrated circuit ROIC may include a touch driving circuit 241a and a touch sensing circuit 241b and may further include a touch control circuit 241c for controlling the touch driving circuit 241a and the touch sensing circuit 241b.

The touch driving circuit 241a may supply a touch driving signal TDS to the touch sensor TE.

The touch sensing circuit 241b receives a touch sensing signal TSS of the touch sensor TE in response to the touch driving signal TDS. To this end, although not shown in the drawings, the touch sensing circuit 241b may include an analog front end AFE, an analog digital converter ADC, and a digital processing part. The analog front end AFE may include circuits of an amplifier and correlated double sampling CDS. The analog digital converter ADC may convert an output of the analog front end AFE to generate sensing raw data. The digital processing part may process the sensing raw data to generate sensing data.

According to one embodiment of the present disclosure, as shown in FIG. 3, the touch sensing circuit 241b may calculate touch coordinate data TCD using the generated sensing data through a preset algorithm.

When the touch sensor TE is implemented as a mutual capacitance type sensor, the touch driving device 241 may supply touch driving signals to the touch sensors TE and detects a change in capacitance of the touch sensors TE through the touch lines T1 to Tk, thereby generating a touch sensing signal. Alternatively, when the touch sensor TE is implemented as a self-capacitance type sensor, the touch driving device 241 may supply touch driving signals to the touch sensors TE using a single circuit and acquire touch sensing signals from the touch sensors TE.

The touch controller 242 receives the touch coordinate data TCD from the touch sensing circuit of the plurality of readout integrated circuits ROIC and transmits the touch coordinate data TCD to the external host system.

The touch controller 242 may transmit or receive the touch coordinate data TCD to or from the plurality of readout integrated circuits ROIC using a serial interface method. For example, the touch controller 242 may transmit or receive the touch coordinate data TCD to or from the plurality of readout integrated circuits ROIC using a method such as UART (RS232), a serial peripheral interface (SPI), inter-integrated circuit (I2C), or controller area network (CAN).

In addition, although not shown in the drawings, the touch sensing device 240 may further include a touch modulation integrated circuit configured to synchronize and modulate a scan pulse input to the gate lines G1 to Gm and the common voltage Vcom during the touch sensing period TP with the touch driving signal TDS.

According to another embodiment of the present disclosure, as shown in FIG. 4, the touch display driving device 200 may include a timing controller 210, a gate driving device 220, and a data touch integrated driving device 250 with the above-described data driving device 230, the touch driving device 241, the touch controller 242, and the integrated touch modulation integrated circuit. The data touch integrated driving device 250 may include a plurality of data touch driving integrated circuits 251, 252, . . . , 25p. Accordingly, each data touch driving integrated circuit 251, 252, . . . , 25p may include a data driving circuit included in the above-described source drive integrated circuit SDIC, and a touch driving circuit 241a and a touch sensing circuit 241b which are included in the readout integrated circuit ROIC.

A connection relationship between the touch panel and the touch driving device in the touch sensing device according to one embodiment of the present disclosure will be described in detail with reference to FIGS. 5 and 6.

As shown in FIG. 5, in the touch display device 1000, in order to implement a large-area touch display device, the touch display panel 100 may include the first touch display panel 110 and the second touch display panel 120, the first touch display panel 110 includes a plurality of pixels and a first panel touch sensor TE1, and the second touch display panel 120 includes a plurality of pixels and a second panel touch sensor TE2. Accordingly, the touch sensor TE of the touch display panel 100 includes the first panel touch sensor TE1 located in the first touch display panel 110 and the second panel touch sensor TE2 located in the second touch display panel 120. However, the present disclosure is not limited thereto, and the first touch display panel 110 may be separately formed as a first display panel including a plurality of pixels and a first touch panel including the first panel touch sensor TE1, and the second touch display panel 120 may be separately formed as a second display panel including a plurality of separate pixels and a second touch panel including the second panel touch sensor TE2.

The touch display device 1000 includes a first data touch driving integrated circuit 251 configured to drive the first touch display panel 110 and a second data touch driving integrated circuit 252 configured to drive the second touch display panel 120.

The touch sensing device according to one embodiment of the present disclosure may include the first touch panel included in the first touch display panel 110, the second touch panel included in the second touch display panel 120, a touch driving device included in the first data touch driving integrated circuit 251 and configured to drive a portion of the second touch panel the first touch panel, and a touch driving device included in the second data touch driving integrated circuit 252 and configured to drive the second touch panel.

The first data touch driving integrated circuit 251 and the second data touch driving integrated circuit 252 may transmit or receive the touch coordinate data TCD using a serial interface method. The first data touch driving integrated circuit 251 and the second data touch driving integrated circuit 252 may transmit or receive the touch coordinate data TCD using a method such as UART (RS232), a SPI, an I2C, or CAN. For example, the first data touch driving integrated circuit 251 may transmit the touch coordinate data TCD to the second data touch driving integrated circuit 252 through a serial communication line CSC_SPI connected to the second data touch driving integrated circuit 252. In this case, during data communication between the first data touch driving integrated circuit 251 and the second data touch driving integrated circuit 252, the first data touch driving integrated circuit 251 that is a slave may transmit the touch coordinate data TCD to the second data touch driving integrated circuit 252 that is a master, and the second data touch driving integrated circuit 252 transmits the touch coordinate data TCD received from the first data touch driving integrated circuit 251 and touch coordinate data TCD calculated by the second data touch driving integrated circuit 252 to the host system. However, the present disclosure is not limited thereto, and the first data touch integrated circuit 251 that is a master may receive the touch coordinate data TCD from the second data touch driving integrated circuit 252 that is a slave, and the first data touch driving integrated circuit 251 may transmit the touch coordinate data TCD received from the second data touch driving integrated circuit 252 and touch coordinate data TCD calculated by the first data touch driving integrated circuit 251 to the host system.

In addition, as described above, each of the first data touch driving integrated circuit 251 and the second data touch driving integrated circuit 252 may include the data driving circuit included in the source drive integrated circuit SDIC of the data driving device, and the touch driving circuit 241a and the touch sensing circuit 241b which are included in the readout integrated circuit ROIC of the touch driving device.

According to one embodiment of the present disclosure, the second panel touch sensor TE2 may include a dual connected touch sensor TE_DS connected to both of the first data touch driving integrated circuit 251 and the second data touch driving integrated circuit 252, and the dual connected touch sensor TE_DS may be located adjacent to the first touch display panel 110. That is, a portion of the second panel touch sensor TE2 located adjacent to the first touch display panel 110 may be the dual connected touch sensor TE_DS connected to both of the first data touch driving integrated circuit 251 and the second data touch driving integrated circuit 252.

In addition, according to one embodiment of the present disclosure, the first data touch driving integrated circuit 251 may include 1-1 to 1-3 driving device pads L1_P1 to L1_P3, and the second data touch driving integrated circuit 252 may include 2-1 and 2-2 driving device pads L2_P1 and L2_P2.

Referring to FIG. 6, first to sixth touch sensors C1 to C6 that are the first panel touch sensor TE1 are connected to the first data touch driving integrated circuit 251 through first to sixth touch display pads D_P1 to D_P6 and the 1-1 and 1-2 driving device pads L1_P1 and L1_P2, and tenth to twelfth touch sensors C10 to C12 that are the second panel touch sensors TE2, excluding the dual connected touch sensor TE_DS, are connected to the second data touch driving integrated circuit 252 through thirteenth to fifteenth touch display pads D_P13 to D_P15 and the 2-2 driving device pad L2_P2. Also, according to one embodiment of the present disclosure, seventh to ninth touch sensors C7 to C9 that are the dual connected touch sensor TE_DS are connected to the first data touch driving integrated circuit 251 through seventh to ninth touch display pads D_P7 to D_P9 and the 1-3 driving device pad L1_P3 and are connected to the second data touch driving integrated circuit 252 through the tenth to twelfth touch display pads D_P10 to D_P12 and the 2-1 driving device pad L2_P1. That is, the seventh touch sensor C7 that is the dual connected touch sensor TE_DS is connected to the first data touch driving integrated circuit 251 through the seventh touch display pad D_P7 and the 1-3 driving device pad L1_P3 and is connected to the second data touch driving integrated circuit 252 through the tenth touch display pad D_P10 and the 2-1 driving device pad L2_P1.

As described above, each of the first data touch driving integrated circuit 251 and the second data touch driving integrated circuit 252 may include the data driving circuit included in the source drive integrated circuit SDIC and the touch driving circuit and the touch sensing circuit which are included in the readout integrated circuit ROIC, the first to third driving device pads L1_P1 to L1_P3 may be selectively connected to the data driving circuit, the touch driving circuit, and the touch sensing circuit under the control of 1-1 to 1-3 driving switches L1_S1 to L1_S3 of the first data touch driving integrated circuit 251, and the 2-1 to 2-2 driving device pads L2_P1 to L2_P2 of the second data touch driving integrated circuit 252 may be connected to the data driving circuit, the touch driving circuit, and the touch sensing circuit under the control of the 2-1 to 2-2 driving switches L2_S1 to L2_S2 of the second data touch driving integrated circuit 252.

Hereinafter, a method of driving a touch display driving device according to one embodiment of the present disclosure will be described in detail with reference to FIGS. 7 to 9C.

Figure 7:
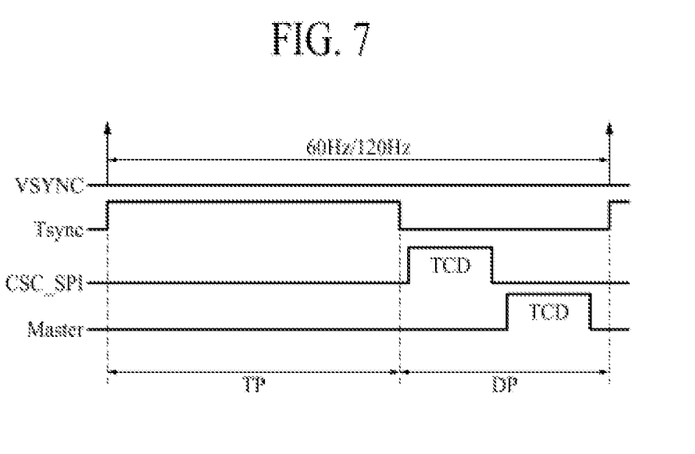
FIG. 7 is a communication timing diagram between readout integrated circuits of the touch sensing device according to one embodiment of the present disclosure.
Figure 8:
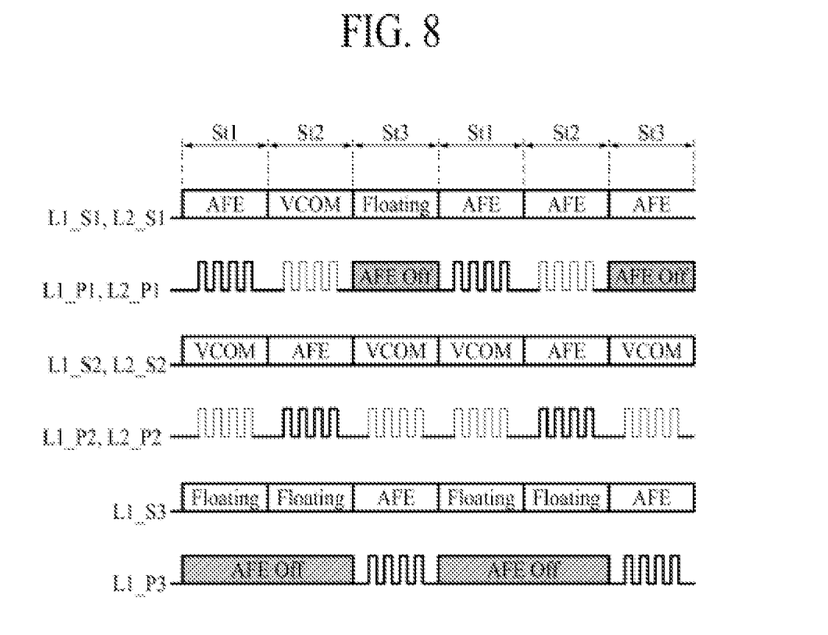
FIG. 8 is a detailed driving timing diagram of the touch driving device according to one embodiment of the present disclosure.
Figure 9A:
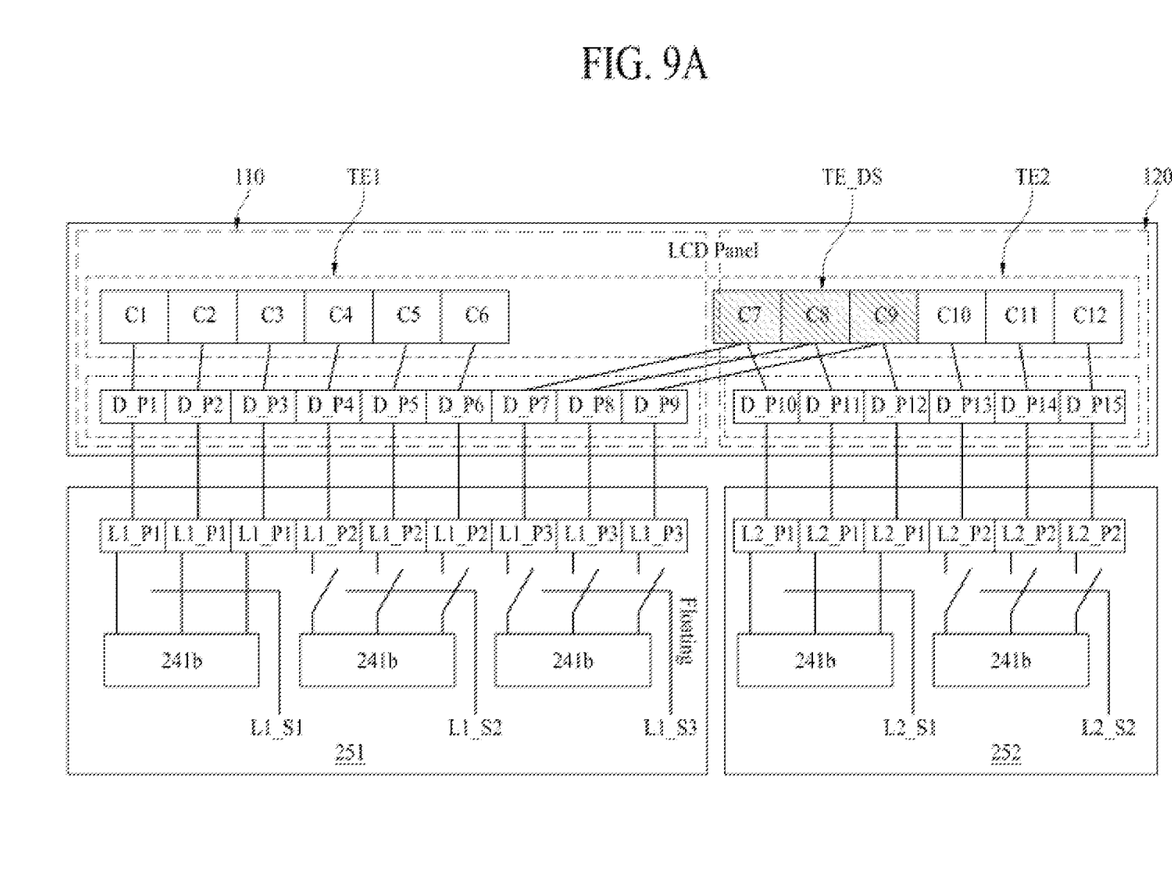
FIGS. 9A, 9B and 9C are diagrams illustrating operations of the touch driving device and the touch sensing device in first to third driving stages according to one embodiment of the present disclosure.
Figure 9B:
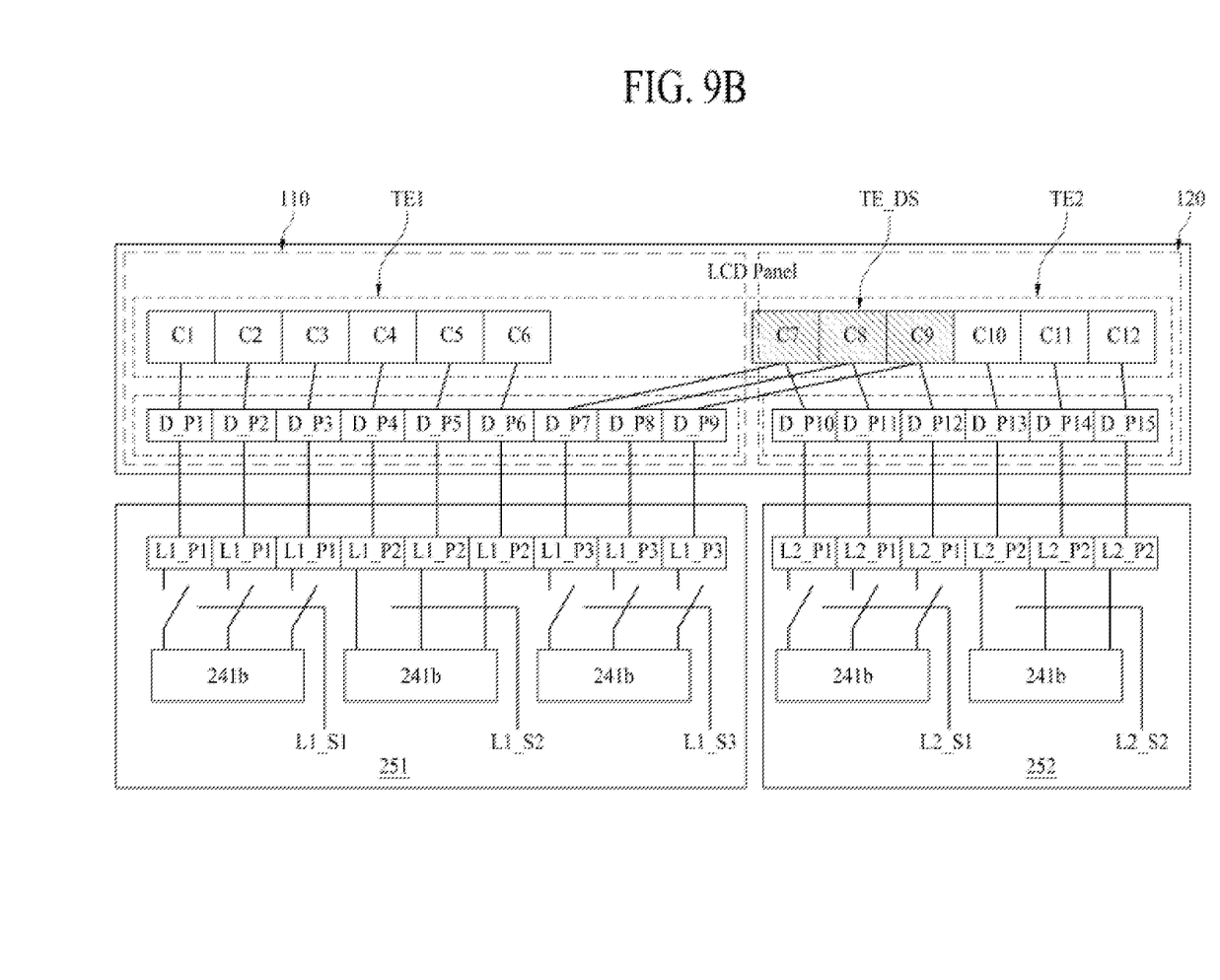
Figure 9C:
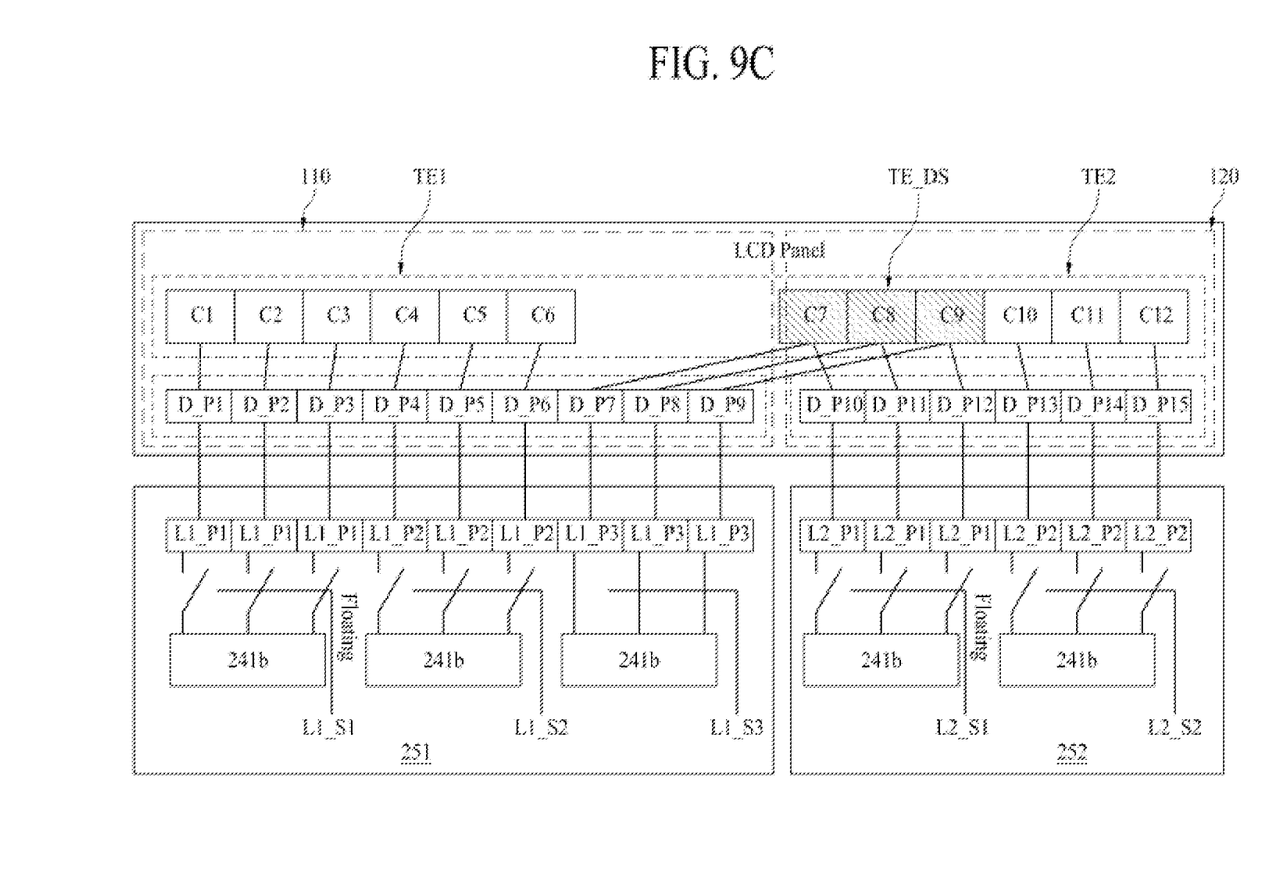

FIG. 7 is a communication timing diagram between the readout integrated circuits of the touch display driving device according to one embodiment of the present disclosure, FIG. 8 is a detailed driving timing diagram of the touch display driving device according to one embodiment of the present disclosure, and FIGS. 9A to 9C are diagrams illustrating operations of the touch display driving device and the touch display device in first to third driving stages according to one embodiment of the present disclosure.

Referring to FIG. 7, as described above, as the touch display panel 100 is driven at a constant frequency such as 60 Hz or 120 Hz, a touch sync signal Tsync generated by a vertical sync signal Vsync is divided in a display period DP and a touch sensing period TP.

During the divided touch sensing period TP, touch sensing signals are sequentially input to the first data touch driving integrated circuit 251 and the second data touch driving integrated circuit 252, and each of the first data touch driving integrated circuit 251 and the second data touch driving integrated circuit 252 calculates touch coordinate data using the received touch sensing signals. In this case, the first data touch driving integrated circuit 251 calculates touch coordinate data of a touch generated in the first touch display panel 110 through the touch sensing signals received from the first panel touch sensor TE1 and the dual connected touch sensor TE_DS, and the second data touch driving integrated circuit 252 calculates touch coordinate data of a touch generated in the second touch display panel 120 through a touch sensing signal received from the second panel touch sensor TE2 including the dual connected touch sensor TE_DS. In particular, since a touch coordinate data calculation algorithm preset in each of the first data touch driving integrated circuit 251 and the second data touch driving integrated circuit 252 calculates the touch coordinate data using a distribution of the detected touch sensing signal, according to one embodiment of the present disclosure, the first data touch driving integrated circuit 251 receives the touch sensing signal that is raw data from the dual connected touch sensor TE_DS of the second touch display panel 120, which is located adjacent to the first touch display panel 110 so that the first touch display panel 110 may directly calculate the touch coordinate data for the touch occurring at a position adjacent to the second touch display panel 120. Accordingly, since the first data touch driving integrated circuit 251 transmits the touch sensing signal generated from the first touch display panel 110 to the second data touch driving integrated circuit 252, and there is no need for the first touch display panel 110 to separately calculate touch coordinate data for a touch occurring at a position adjacent to the second touch display panel 120, it is possible to reduce an amount of data transmitted to the second data touch driving integrated circuit 252.

During the divided display period DP, the first data touch driving integrated circuit 251 transmits touch coordinate data TCD of a touch generated in the first touch display panel 110 to the second data touch driving integrated circuit 252, and the second data touch driving integrated circuit 252 transmits the touch coordinate data TCD received from the first data touch driving integrated circuit 251 and touch coordinate data TCD of a touch generated in the second touch display panel 120 to the host system.

According to one embodiment of the present disclosure, it is possible to reduce power consumption for transmitting the touch sensing data and reduce a data transmission time to lower noise such as an electromagnetic interference (EMI).

Although one embodiment of the present disclosure has been described in which the touch display panel 100 includes the first and second touch display panels 110 and 120, the number of touch display panels is not limited thereto, and the touch display panel may include three or more displays.

As shown in FIG. 8, the first data touch driving integrated circuit 251 and the second data touch driving integrated circuit 252 may each operate in first to third driving stages according to a connection relationship between the first to third driving device pads L1_P1 to L1_P3 of the first data touch driving integrated circuit 251, the data driving circuit, the touch driving circuit, and the touch sensing circuit, and a connection relationship between the first to third driving device pads L2_P1 to L2_P3 of the second data touch driving integrated circuit 252, the data driving circuit, the touch driving circuit, and the touch sensing circuit. In addition, first panel touch sensors TE1 may sequentially operate, and second panel touch sensors TE2 may sequentially operate.

During a first touch driving stage St1, as shown in FIGS. 8 and 9A, the 1-1 driving switch L1_S1 may be controlled to connect the touch sensing circuit 241b to the 1-1 driving device pads L1_P1 of the first data touch driving integrated circuit 251, and the first data touch driving integrated circuit 251 may receive touch sensing signals from the first to third touch sensors C1 to C3 through the 1-1 driving device pads L1_P1. The 2-1 driving switch L2_S1 may be controlled to connect the touch sensing circuit 241b to the 2-1 driving device pads L2_P1 of the second data touch driving integrated circuit 252, and the second data touch driving integrated circuit 252 may receive touch sensing signals from the seventh to ninth touch sensors C7 to C9 that are the dual connected touch sensors TE_DS through the 2-1 driving device pads L2_P1.

Although not shown in the drawings, the 1-2 driving switch L1_S2 may be controlled to connect the touch driving circuit to the 1-2 driving device pads L1_P2 of the first data touch driving integrated circuit 251, and the first data touch driving integrated circuit 251 may transmit the common voltage Vcom to the fourth to sixth touch sensors C4 to C6 connected to the 1-2 driving device pads L1_P2. The 2-2 driving switch L2_S2 may be controlled to connect the touch driving circuit to the 2-2 driving device pads L2_P2 of the second data touch driving integrated circuit 252, and the second data touch driving integrated circuit 252 may transmit the common voltage Vcom to the tenth to twelfth touch sensors C10 to C12 connected to the 2-2 driving device pads L2_P2.

In addition, as shown in FIGS. 8 and 9A, the 1-3 driving switch L1_S3 is floated, and the touch sensing circuit of the first data touch driving integrated circuit 251 is turned off. Specifically, the 1-3 driving switch L1_S3 is floated, and the analog front end AFE of the touch sensing circuit 241b of the first data touch driving integrated circuit 251 is turned off.

Although not shown in the drawings, during a second touch driving stage St2, the 1-1 driving switch L1_S1 may be controlled to connect the touch driving circuit to the 1-1 driving device pads L1_P1 of the first data touch driving integrated circuit 251, and the first data touch driving integrated circuit 251 may transmit the common voltage Vcom to the first to third touch sensors C1 to C3 connected to the 1-1 driving device pads L1_P1. The 2-1 driving switch L2_S1 may be controlled to connect the touch driving circuit to the 2-1 driving device pads L2_P1 of the second data touch driving integrated circuit 252, and the second data touch driving integrated circuit 252 may transmit the common voltage Vcom to the seventh to ninth touch sensors C7 to C9 connected to the 2-1 driving device pads L2_P1.

As shown in FIGS. 8 and 9B, the 1-2 driving switch L1_S2 may be controlled to connect the touch sensing circuit 241b to the 1-2 driving device pads L1_P2 of the first data touch driving integrated circuit 251, and first data touch driving integrated circuit 251 may receive touch sensing signals from the fourth to sixth touch sensors C4 to C6 through the 1-2 driving device pads L1_P2. The 2-2 driving switch L2_S2 may be controlled to connect the touch sensing circuit 241b to the 2-2 driving device pads L2_P2 of the second data touch driving integrated circuit 252, and the second data touch driving integrated circuit 252 may receive touch sensing signals from the tenth to twelfth touch sensors C10 to C12 through the 2-2 driving device pads L2_P2.

In addition, as shown in FIGS. 8 and 9B, the 1-3 driving switch L1_S3 may be controlled to connect the touch driving circuit to the 1-3 driving device pads L1_P3, and the first data touch driving integrated circuit 251 may transmit the common voltage Vcom to the seventh to ninth touch sensors C7 to C9 connected to the 1-3 driving device pads L1_P3.

During a third touch driving stage St3, the 1-1 driving switch L1_S1 is floated, and the touch sensing circuit 241b of the first data touch driving integrated circuit 251 is turned off. The 2-1 driving switch L2_S1 is floated, and the touch sensing circuit 241b of the second data touch driving integrated circuit 252 is turned off. Specifically, the 1-1 driving switch L1_S1 is floated, and the analog front end AFE of the touch sensing circuit 241b of the first data touch driving integrated circuit 251 is turned off. The 2-1 driving switch L2_S1 is floated, and the analog front end AFE of the touch sensing circuit 241b of the second data touch driving integrated circuit 252 is turned off.

Although not shown in the drawings, the 1-2 driving switch L1_S2 may be controlled to connect the touch driving circuit to the 1-2 driving device pads L1_P2 of the first data touch driving integrated circuit 251, and the first data touch driving integrated circuit 251 may transmit the common voltage Vcom to the fourth to sixth touch sensors C4 to C6 connected to the 1-2 driving device pads L1_P2. The 2-2 driving switch L2_S2 may be controlled to connect the touch driving circuit to the 2-2 driving device pads L2_P2 of the second data touch driving integrated circuit 252, and the second data touch driving integrated circuit 252 may transmit the common voltage Vcom to the tenth to twelfth touch sensors C10 to C12 connected to the 2-2 driving device pads L2_P2.

In addition, as shown in FIGS. 8 and 9C, the 1-3 driving switch L1_S3 may be controlled to connect the touch sensing circuit 241b to the 1-3 driving device pads L1_P3 of the first data touch driving integrated circuit 251, and the first data touch driving integrated circuit 251 may receive touch sensing signals from the seventh to ninth touch sensors C7 to C9 that are the dual connected touch sensors TE_DS through the 1-3 driving device pads L1_P3. The 2-3 driving switch L2_S3 may be controlled to connect the touch sensing circuit 241b to the 2-3 driving device pads L2_P3 of the second data touch driving integrated circuit 252, and the second data touch driving integrated circuit 252 may receive touch sensing signals from the tenth to twelfth touch sensors C10 to C12 through the 2-3 driving device pads L2_P3.

According to one embodiment of the present disclosure, during the first touch driving stage St1, the second data touch driving integrated circuit 252 receives the touch sensing signals from the seventh to ninth touch sensors C7 to C9 that are the dual connected touch sensors TE_DS, and during the third touch driving stage St3, the first data touch driving integrated circuit 251 receives the touch sensing signals from the seventh to ninth touch sensors C7 to C9 that are the dual connected touch sensors TE_DS so that the first data touch driving integrated circuit 251 may calculate touch coordinate data of a touch generated in the first touch display panel 110 and transmit the calculated touch coordinate data to the second data touch driving integrated circuit 252. In particular, since the first data touch driving integrated circuit 251 transmits only the touch coordinate data of the touch generated in the first touch display panel 110, excluding the touch sensing data that is raw data, to the second data touch driving integrated circuit 252, it is possible to reduce power consumption for transmitting the touch sensing data and reduce a data transmission time to lower an EMI noise.

Since a touch driving device according to one embodiment of the present disclosure receives touch sensing data of another touch panel located adjacent thereto, directly calculates touch coordinate data, and transmits only the touch coordinate data excluding the touch sensing data, it is possible to reduce power consumption for transmitting the touch sensing data and reduce a data transmission time to lower noise such as an electromagnetic interference (EMI).

It will be apparent to those skilled in the art that various changes and modifications may be made without departing from the spirit and scope of the disclosure.

In addition, at least a part of the methods described herein may be implemented using one or more computer programs or components. These components may be provided as a series of computer instructions through a computer-readable medium or a machine-readable medium, which includes volatile and non-volatile memories. The instructions may be provided as software or firmware and may be entirely or partially implemented in a hardware configuration such as application specific integrated circuits (ASICs), field programmable gate arrays (FPGAs), digital signal processors (DSPs), or other similar devices. The instructions may be configured to be executed by one or more processors or other hardware components, and when one or more processors or other hardware components execute the series of computer instructions, one or more processors or other hardware components may entirely or partially perform the methods and procedures disclosed herein.

Therefore, it should be understood that the above-described embodiments are not restrictive but illustrative in all aspects. The scope of the present disclosure is defined by the appended claims rather than the detailed description, and it should be construed that all alternations or modifications derived from the meaning and scope of the appended claims and the equivalents thereof fall within the scope of the present disclosure.

What is claimed is:

1. A touch driving device comprising:
a touch sensing circuit configured to receive a touch sensing signal from a touch panel including a first touch panel and a second touch panel; and
a plurality of driving device pads connected to the touch panel and selectively connected to the touch sensing circuit,
wherein the plurality of driving device pads are divided into a first driving device pad, a second driving device pad, and a third driving device pad, and
when the touch sensing signal is received from the first touch panel through the first and second driving device pads, the touch sensing circuit connected to the third driving device pad is turned off.

2. The touch driving device of claim 1, wherein, when the touch sensing signal is received from the second touch panel through the third driving device pad, the touch sensing circuit connected to the first driving device pad is turned off.

3. The touch driving device of claim 1, wherein, when the touch sensing signal is received from the first touch panel through the first and second driving device pads, the third driving device pad is floated.

4. The touch driving device of claim 1, wherein, when the touch sensing signal is received from the second touch panel through the third driving device pad, the first driving device pad is floated.

5. The touch driving device of claim 1, further comprising, a touch driving circuit configured to transmit a touch driving signal and a common voltage to the touch panel,
wherein the first driving device pad is connected to one of the touch sensing circuit and the touch driving circuit or is floated,
the second driving device pad is connected to one of the touch sensing circuit and the touch driving circuit, and
the third driving device pad is connected to the touch sensing circuit or is floated.

6. The touch driving device of claim 1, wherein the touch sensing circuit generates touch coordinate data using a touch sensing signal received from the first touch panel and a touch sensing signal received from the second touch panel and transmits the touch coordinate data.

7. A touch driving device comprising:
a first touch sensing circuit configured to receive a touch sensing signal from a touch panel including a first touch panel and a second touch panel;
a plurality of second touch sensing circuits configured to receive a touch sensing signal from the second touch panel;
a plurality of first driving device pads connected to the first touch panel and selectively connected to the first touch sensing circuit; and
a plurality of second driving device pads connected to the second touch panel and selectively connected to the plurality of second touch sensing circuits,
wherein the first touch sensing circuit generates touch coordinate data using a touch sensing signal received from the first touch panel and a touch sensing signal received from the second touch panel and transmits the touch coordinate data to the second touch sensing circuit, and
the second touch sensing circuit calculates touch coordinate data generated using the touch sensing signal received from the second touch panel and the touch coordinate data transmitted from the first touch sensing circuit.

8. The touch driving device of claim 7, wherein:
the plurality of first driving device pads are divided into a 1-1 driving device pad, a 1-2 driving device pad, and a 1-3 driving device pad;
the plurality of second driving device pads are divided into a 2-1 driving device pad and a 2-2 driving device pad; and
when the touch sensing signal is received from the first touch panel through the 1-1 driving device pad and the 1-2 driving device pad, or the touch sensing signal is received from the second touch panel through the 2-1 driving device pad and the 2-2 driving device pad, the 1-3 driving device pad is floated.

9. The touch driving device of claim 7, wherein:
the plurality of first driving device pads are divided into a 1-1 driving device pad, a 1-2 driving device pad, and a 1-3 driving device pad;
the plurality of second driving device pads are divided into a 2-1 driving device pad and a 2-2 driving device pad; and
when the touch sensing signal is received from the second touch panel through the 1-3 driving device pad, the 1-1 driving device pad and the 2-1 driving device pad are floated.

10. The touch driving device of claim 7, further comprising a touch driving circuit configured to transmit a touch driving signal and a common voltage to the touch panel,
wherein the plurality of first driving device pads are divided into a 1-1 driving device pad, a 1-2 driving device pad, and a 1-3 driving device pad,
the 1-1 driving device pad is connected to one of the first touch sensing circuit and the touch driving circuit or is floated,
the 1-2 driving device pad is connected to one among the first touch sensing circuit, the second touch sensing circuit, and the touch driving circuit, and
the 1-3 driving device pad is connected to the first touch sensing circuit or the second touch sensing circuit or is floated.

11. The touch driving device of claim 10, wherein:
the plurality of second driving device pads are divided into a 2-1 driving device pad and a 2-2 driving device pad;
the 2-1 driving device pad is connected to one of the first touch sensing circuit and the touch driving circuit or is floated;
the 2-2 driving device pad is connected to one among the first touch sensing circuit, the second touch sensing circuit, and the touch driving circuit; and
the 1-3 driving device pad is connected to the first touch sensing circuit or the second touch sensing circuit or is floated.

12. The touch driving device of claim 7, further comprising first and second touch driving circuits configured to transmit a touch driving signal and a common voltage to the touch panel,
wherein the plurality of first driving device pads are divided into a 1-1 driving device pad, a 1-2 driving device pad, and a 1-3 driving device pad, and the plurality of second driving device pads are divided into 2-1 and 2-2 driving device pads,
during a first touch driving stage, the 1-1 driving device pad is connected to the first touch sensing circuit to receive the touch sensing signal, the 2-1 driving device pad is connected to the second touch sensing circuit to receive the touch sensing signal, the 1-2 driving device pad is connected to the first touch driving circuit to transmit the common voltage, the 2-2 driving device pad is connected to the second touch driving circuit to transmit the common voltage, and the 1-3 driving device pad is floated, during a second touch driving stage, the 1-1 driving device pad is connected to the first touch driving circuit to transmit the common voltage, the 2-1 driving device pad is connected to the second touch driving circuit to transmit the common voltage, the 1-2 driving device pad is connected to the first touch sensing circuit to receive the touch sensing signal, the 2-2 driving device pad is connected to the second touch sensing circuit to receive the touch sensing signal, and the 1-3 driving device pad is floated, and during a third touch driving stage, the 1-1 driving device pad and the 2-1 driving device pad are floated, the 1-2 driving device pad is connected to the first touch driving circuit to transmit the common voltage, the 2-2 driving device pad is connected to the second touch driving circuit to transmit the common voltage, and the 1-3 driving device pad is connected to the first touch sensing circuit to receive the touch sensing signal.

13. A touch sensing device comprising:
a first touch panel including a first panel touch sensor;
a second touch panel including a second panel touch sensor;
a first touch driving device connected to the first panel touch sensor; and
a second touch driving device connected to the second panel touch sensor,
wherein the second panel touch sensor includes a dual connected touch sensor connected to the first touch driving device and the second touch driving device.

14. The touch sensing device of claim 13, wherein the dual connected touch sensor is located adjacent to the first touch panel.

15. The touch sensing device of claim 13, wherein:
the first touch driving device includes a 1-1 driving device pad, a 1-2 driving device pad, and a 1-3 driving device pad connected to the first panel touch sensor;
the second touch driving device includes a 2-1 driving device pad and 2-2 driving device pad connected to the second panel touch sensor; and
the dual connected touch sensor is connected to the 1-3 driving device pad and the 2-1 driving device pad.

16. The touch sensing device of claim 15, wherein:
when a touch sensing signal is received from the first panel touch sensor through the 1-1 driving device pad and the 1-2 driving device pad, or the touch sensing signal is received from the second panel touch sensor including the dual connected touch sensor through the 2-1 driving device pad and the 2-2 driving device pad, the 1-3 driving device pad is floated; and
when the touch sensing signal is received from the dual connected touch sensor through the 1-3 driving device pad, the 1-1 driving device pad and the 2-1 driving device pad are floated.

17. The touch sensing device of claim 15, wherein the 1-3 driving device pad receives a touch sensing signal from the dual connected touch sensor or is floated.

18. The touch sensing device of claim 15, wherein:
during a first touch driving stage, the 1-1 driving device pad receives a touch sensing signal from a first panel touch sensor connected to the 1-1 driving device pad, the 2-1 driving device pad receives the touch sensing signal from the dual connected touch sensor connected to the 2-1 driving device pad, the 1-2 driving device pad transmits a common voltage to a first panel touch sensor connected to the 1-2 driving device pad, the 2-2 driving device pad transmits the common voltage to a second panel touch sensor connected to a 2-2 driving device pad, and the 1-3 driving device pad is floated;

during a second touch driving stage, the 1-1 driving device pad transmits the common voltage to the first panel touch sensor connected to the 1-1 driving device pad, the 2-1 driving device pad transmits the common voltage to the dual connected touch sensor connected to the 2-1 driving device pad, the 1-2 driving device pad receives the touch sensing signal from the first panel touch sensor connected to the 1-1 driving device pad, the 2-2 driving device pad receives the touch sensing signal from the second panel touch sensor connected to the 2-2 driving device pad, and the 1-3 driving device pad is floated; and during a third touch driving stage, the 1-1 driving device pad and the 2-1 driving device pad are floated, the 1-2 driving device pad transmits the common voltage to the first panel touch sensor connected to the 1-2 driving device pad, the 2-2 driving device pad transmits the common voltage to the second panel touch sensor connected to the 2-2 driving device pad, and the 1-3 driving device pad receives the touch sensing signal from the dual connected touch sensor connected to the 1-3 driving device pad.

19. The touch sensing device of claim 13, wherein the first touch driving device receives the touch sensing signal from the dual connected touch sensor, and the second touch driving device receives the touch sensing signal from the dual connected touch sensor.

* * * * *